United States Patent
Chen et al.

(10) Patent No.: US 8,547,053 B2
(45) Date of Patent: Oct. 1, 2013

(54) ALTERNATING CURRENT CHOPPER CIRCUIT WITH LOW NOISE

(75) Inventors: Yu-Kai Chen, Chiayi (TW); Chin-Hsiung Chang, Taichung (TW)

(73) Assignee: National Formosa University, Yunlin County (TW)

( * ) Notice: Subject to any disclaimer, the term of this patent is extended or adjusted under 35 U.S.C. 154(b) by 205 days.

(21) Appl. No.: 13/069,432

(22) Filed: Mar. 23, 2011

(65) Prior Publication Data

US 2012/0126734 A1    May 24, 2012

(30) Foreign Application Priority Data

Nov. 18, 2010 (TW) .............................. 99139748 A

(51) Int. Cl.
*H02P 3/18* (2006.01)

(52) U.S. Cl.
USPC ...... 318/813; 318/400.26; 318/696; 318/685; 318/801; 318/812; 363/17; 363/40; 363/131; 363/124; 323/271; 315/274

(58) Field of Classification Search
USPC ............... 318/807, 696, 701, 685, 400.13, 318/772, 233, 248, 247, 224, 801, 810, 805, 318/812; 363/124, 134, 17, 40, 131; 323/271; 315/274
See application file for complete search history.

(56) References Cited

U.S. PATENT DOCUMENTS

| | | | |
|---|---|---|---|
| 4,295,083 A * | 10/1981 | Leenhouts | 318/696 |
| 4,368,409 A * | 1/1983 | Sivanesan et al. | 315/411 |
| 4,585,986 A * | 4/1986 | Dyer | 323/271 |
| 5,218,522 A * | 6/1993 | Phelps et al. | 363/124 |
| 5,410,467 A * | 4/1995 | Smith et al. | 363/131 |
| 5,712,771 A * | 1/1998 | Fitter et al. | 363/17 |
| 5,724,236 A * | 3/1998 | Oglesbee | 363/40 |
| 5,991,169 A * | 11/1999 | Kooken | 363/17 |
| 7,102,326 B1 * | 9/2006 | Chen et al. | 318/807 |
| 2007/0188109 A1 * | 8/2007 | Samejima et al. | 315/274 |
| 2008/0100273 A1 * | 5/2008 | Uruno et al. | 323/271 |
| 2010/0039581 A1 * | 2/2010 | Mishima et al. | 349/61 |

* cited by examiner

*Primary Examiner* — Eduardo Colon Santana
*Assistant Examiner* — Jorge Carrasquillo
(74) *Attorney, Agent, or Firm* — Li&Cai Intellectual Property (USA) Office

(57) ABSTRACT

An alternating current chopper circuit with low noise is disclosed. The circuit includes a switching circuit, a first freewheel circuit, and a second freewheel circuit. The switching circuit has a control switching unit, which turns on and or off accordingly to a control signal. The first freewheel circuit and the second freewheel circuit are for providing a current-conducting path to the motor, when the control switching unit is turned off.

9 Claims, 8 Drawing Sheets

ALTERNATING CURRENT CHOPPER CIRCUIT WITH LOW NOISE

BACKGROUND OF THE INVENTION

1. Field of the Invention

The instant disclosure relates to an alternating current chopper circuit; in particular, to an alternating current chopper circuit with low noise.

2. Description of Related Art

A motor typically has a driving circuit to drive the motor and provide speed control. As shown in FIG. 1, a driving circuit of an induction motor 10 is illustrated. Of the shown driving circuit, the switching units $Q_a$ and $Q_b$ are turned on or off by the control signal $V_{PWM1}$. The switching units $Q_c$ and $Q_d$ are turned on or off by the control signal $V_{PWM2}$. The waveforms of the control signals $V_{PWM2}$ and $V_{PWM2}$ are shown in FIG. 1B.

By adjusting the duty cycle of the control signal $V_{PWM1}$, the averaged power received by the motor 10 can be changed, thereby controlling the motor speed. Regardless of the load associated with the motor (e.g., resistive load or reactive load), the current flow must be continuous to maintain circuit stability. When the control signal $V_{PWM1}$ is off, and no current-conducting path is provided to the motor 10, an instantaneous high voltage may be delivered to the motor components, which may damage the circuitry thereof. Therefore, controlled by the control signal $V_{PWM2}$, the switching units $Q_c$ and $Q_d$ are used to provide a current-conducting path for the motor 10, when the switching units $Q_a$ and $Q_b$ are turned off.

When the control signal $V_{PWM1}$ is at the high voltage level, and the control signal $V_{PWM2}$ is at the low voltage level, the input voltage of the alternating current (AC) power $V_{in}$ is supplied to the motor 10 via the switching units $Q_a$ and $Q_b$. When the control signal $V_{PWM1}$ is switched to the low voltage level, and the control signal $V_{PWM2}$ is switched to the high voltage level, the motor 10 may utilize the switching units $Q_c$ and $Q_d$ to provide a path for passing the current, so as to maintain the continuous current flow through the motor 10 and prevent the components from being damaged.

To prevent short circuit by the AC power $V_{in}$, a dead time $t_d$ exists in between the control signals $V_{PWM1}$ and $V_{PWM2}$, as shown in FIG. 1B. However, in the period of the dead time $t_d$, the current flow of the motor 10 is discontinued, with the surge current causing the damage to the switching units $Q_a$, $Q_b$, $Q_c$, and $Q_d$. Thereby, as shown in FIG. 1A, snubbering units comprised of the resistors $R_a$, $R_b$, $R_c$, and $R_d$ and the capacitors $C_a$, $C_b$, $C_c$, and $C_d$ are included. The resistors and capacitors are coupled to the respective switching units, to provide snubbering against the power surge due to discontinuous current at the switching units $Q_a$, $Q_b$, $Q_c$, and $Q_d$ during the period of the dead time $t_d$.

Even with the snubbering unit, the voltages withstand by the switching units are inevitably unstable, which lead to malfunction and damage of the driver circuit. In addition, the RC (resistor-capacitor) snubbering units must be configured with different parameter values depending on the type of the motor 10 and different specifications of the switching units $Q_a$, $Q_b$, $Q_c$, and $Q_d$, complicating the design of the driver circuit.

Please refer to FIG. 2, which shows a driver circuit of an induction motor. When the switching unit $Q_e$ is turned on and the switching unit $Q_f$ is turned off, the AC power $V_{in}$, would magnetize the motor 10. When the switching unit $Q_e$ is turned off and the switching unit $Q_f$ is turned on, the motor 10 utilizes the current-conducting path provided by the switching unit $Q_f$ to maintain the continuous current flow. However, similar to the conventional motor shown in FIG. 1A, to prevent the occurrence of short circuit by the AC power $V_{in}$, a dead time period still exists in the conventional motor shown in FIG. 1B, and thus neither the switching units $Q_e$ nor $Q_f$ could be turned on immediately after the other has been turned off. Thereby, during the dead time period, the current flow of the motor still would be discontinuous which may damage the circuitry.

SUMMARY OF THE INVENTION

With regard to aforementioned issues, the instant disclosure provides an alternating current chopper circuit with low noise. Based on the circuit design, the original switching unit providing the current-conducting path no longer requires an extra control signal for turning on/off the switching unit. Instead, with only one control signal, the issue associated with the dead time period no longer exists. As such, the snubbering units may be no longer necessary, helping simplify the circuit design.

To achieve the above objective, the instant disclosure provides an alternating current chopper circuit with low noise, which comprises a switching circuit, a first freewheel circuit, and a second freewheel circuit.

The switching circuit includes a control switching unit. The control switching unit is turned on/off according to a control signal supplied by a drive controller, for adjusting an average power to a load. The first freewheel circuit is connected electrically to the switching circuit and the load. The first freewheel circuit includes a first switching unit and a first transferring unit, where the first freewheeling unit is connected to a control end of the first switching unit. The second freewheel circuit is connected electrically to the switching circuit and the load. The second freewheel circuit includes a second switching unit and a second transferring unit, where the second freewheeling unit is connected to a control end of the second switching unit.

When the control switching unit is turned off, the first freewheeling unit would turn on the first switching unit, or the second freewheeling unit would turn on the second switching unit, to provide a current-conducting path for the load. Specifically, the first freewheeling unit and the second freewheeling unit may be transformers, connected in series to the switching circuit, or connected to the control end of the first switching unit and the second switching unit respectively, and controls the first switching unit and the second switching unit to turn on respectively while the control switching unit is turned off, to provide the current-conducting path for the load.

Through the design of the transferring unit, the circuit providing the current-conducting path no longer requires an extra control signal. The continuity of the current flow of the load may also be maintained to prevent circuit instability.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

BRIEF DESCRIPTION OF THE DRAWINGS

FIG. 5A shows an operation diagram of an alternating current chopper circuit with low noise, where both the input voltage and current are positive and the control switching unit is turned on.

FIG. 6A shows an operation diagram of an alternating current chopper circuit with low noise, where both the input voltage and current are negative and the control switching unit is turned on.

FIG. 7A shows an operation diagram of an alternating current chopper circuit with low noise, where the input voltage is negative, the input current is positive, and the control switching unit is turned on.

FIG. 7B shows an operation diagram of an alternating current chopper circuit with low noise, where the input voltage is positive, the input current is negative, and the control switching unit is turned on.

DETAILED DESCRIPTION OF THE PREFERRED EMBODIMENTS

Figure 1A:
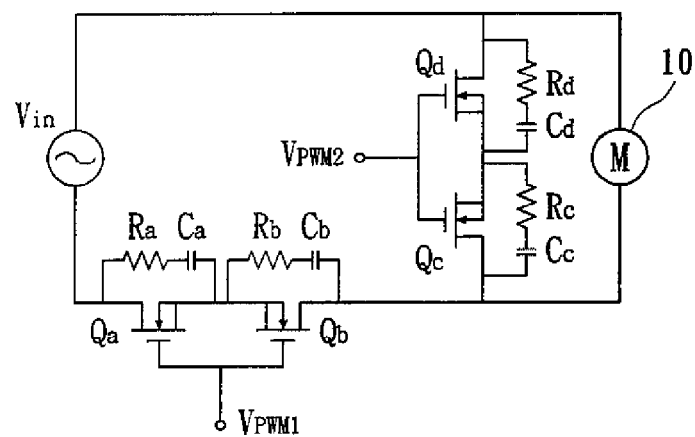
FIG. 1A shows a driver circuitry of the load of the prior art.
Figure 1B:
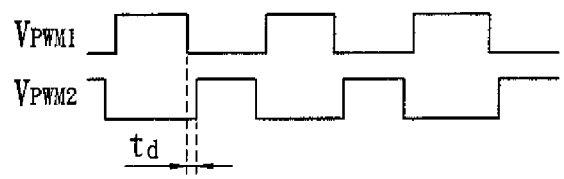
FIG. 1B shows waveforms of the control signals of the switching units of the driver circuitry of the load of the prior art.
Figure 2:
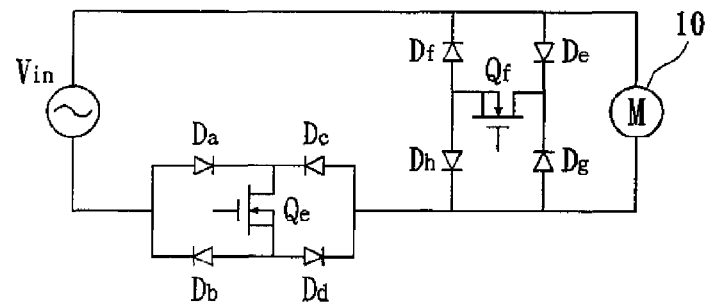
FIG. 2 shows another driver circuitry of the load of the prior art.
Figure 3:
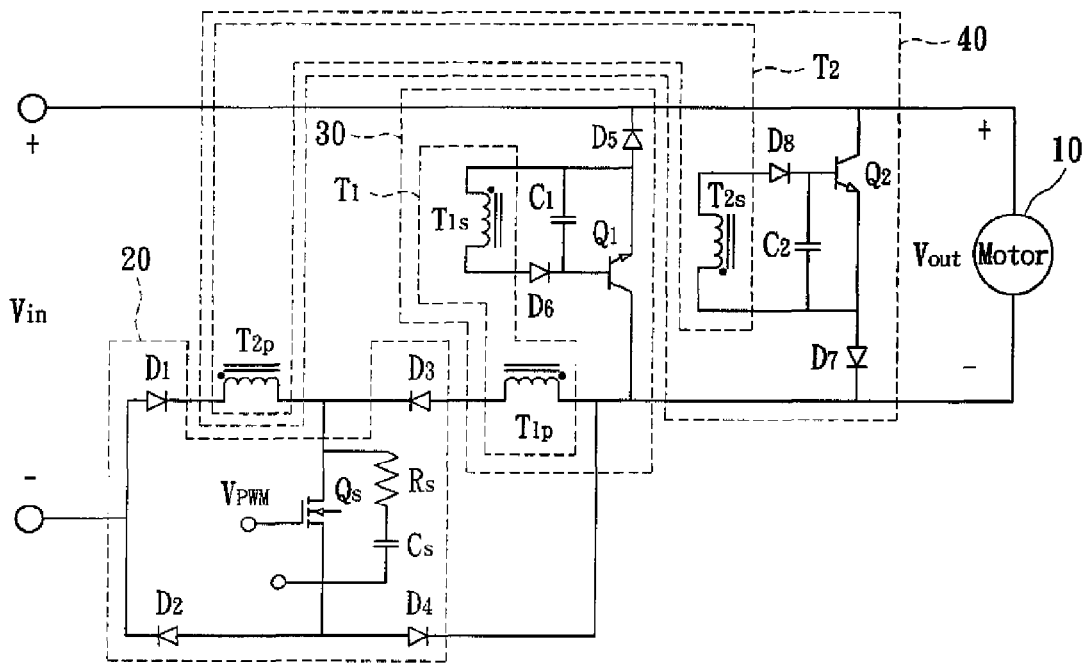
FIG. 3 shows a circuit diagram of an embodiment of an alternating current chopper circuit with low noise of the instant disclosure.

Please refer to FIG. 3. The alternating current chopper circuit with low noise of the instant disclosure includes a switching circuit 20, a first freewheel circuit 30, and a second freewheel circuit 40. The switching circuit 20 is connected to an AC power $V_{in}$ and a load in series. In one implementation, the load may be a motor 10 and throughout the instant disclosure the motor 10 serves a primary example of the load while it is worth noting that the circuit of the instant disclosure is not limited for driving the motor only. The first freewheel circuit 30 and the second freewheel circuit 40 are connected to the motor 10 in parallel and connected electrically to the switching circuit 20.

Figure 4:
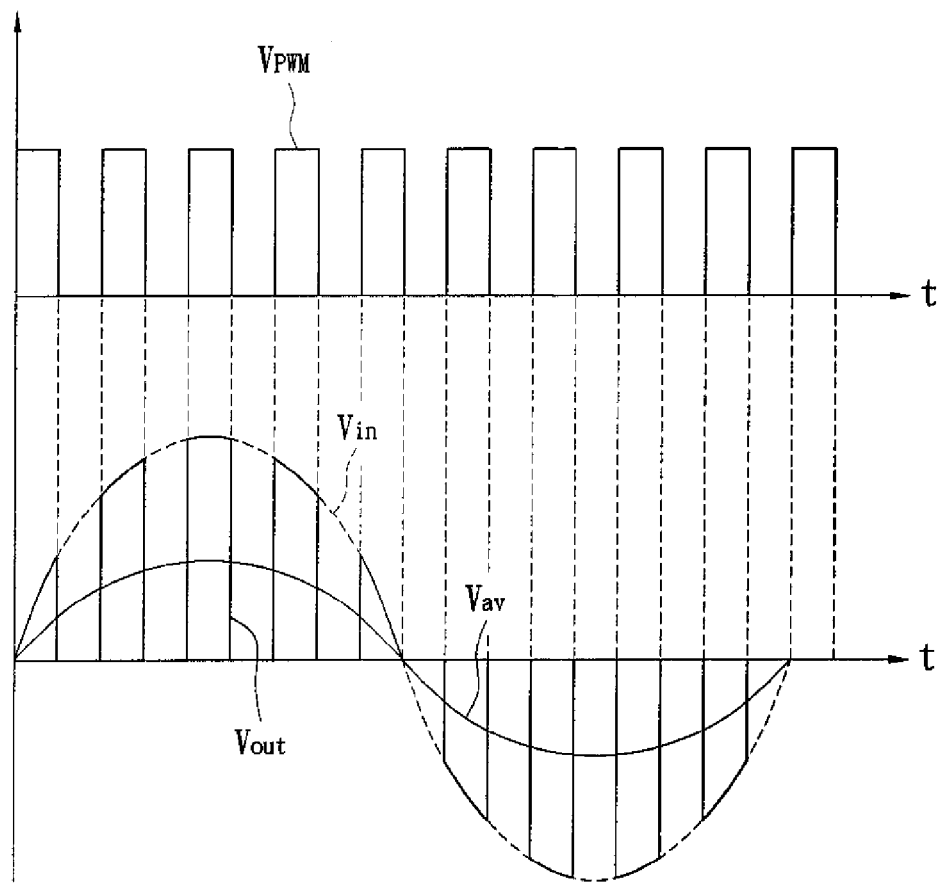
FIG. 4 shows waveforms of a control signal, an AC power input, and an AC power output of the instant disclosure.

The switching circuit 20 includes a control switching unit $Q_s$. The control switching unit $Q_s$ is turned on or off according to a control signal $V_{PWM}$ supplied from a drive controller (not shown). As shown in FIG. 4, when a duty cycle of the control signal $V_{PWM}$ is adjusted, an average voltage $V_{av}$ and average current $I_{av}$ from the AC power $V_{in}$, to the motor 10 may be adjusted accordingly, thereby controlling a speed of the motor 10. The greater duty cycle of the control signal $V_{PWM}$ may correspond to the increased average voltage $V_{av}$, average current $I_{av}$ and the increased speed of the motor 10. Please refer back to FIG. 3 for the illustration of the switching circuit being divided into a first path and a second path. The first path refers to a path constituted by the diodes $D_2$ and $D_3$ and the control switching unit $Q_s$, while the second path refers to a path constituted by the diodes $D_1$ and $D_4$ and the control switching unit $Q_s$. Meanwhile, the control switching unit $Q_s$ may be a metal-oxide-semiconductor field-effect transistor (MOSFET).

The first freewheel circuit 30 includes a first switching unit $Q_1$, a first freewheeling unit $T_1$, a first one-way freewheeling unit $D_5$, and a first capacitor $C_1$. In one implementation, the first one-way freewheeling unit $D_5$ may be a diode, and the first switching unit $Q_1$ may be a bipolar junction transistor (BJT), both of which may be connected to the motor 10 in parallel in order to provide a current-conducting path with the motor 10 when the control switching unit $Q_s$ is turned off. The first transferring unit $T_1$ may be a transformer having a primary winding $T_{1p}$ thereof connected to the first path of the switching circuit 20 in series. The first transferring unit $T_1$ may further have a secondary winding $T_{1s}$ thereof connected to a first switch control end, which may be a base in the current embodiment, of the first switching unit $Q_1$ for turning the first switching unit $Q_1$ on or off. Meanwhile, the first capacitor $C_1$ is connected to the secondary winding $T_{1s}$ of the first transferring unit $T_1$ in parallel, and is also connected to the first switch control end of the first switching unit $Q_1$ in parallel.

Similarly, the second freewheel circuit 40 comprises a second switching unit Q2, a second transferring unit $T_2$, a second one-way freewheeling unit $D_7$, and a second capacitor $C_2$. The second one-way freewheeling unit $D_7$ may be a diode, and the second switching unit $Q_2$ may be a BJT, both of which may be connected to the motor 10 in parallel, for providing another current-conducting path to the motor 10 when the control switching unit $Q_s$ is turned off. The second transferring unit $T_2$ may be a transformer having a primary winding $T_{2p}$ connected to the second path of the switching circuit 20 in series, and a secondary winding $T_{2s}$ connected to a second switch control end, which may be a base, of the second switching unit $Q_2$. The second capacitor $C_2$ is connected to the secondary winding $T_{2s}$ of the second transferring unit $T_2$ in parallel, and is connected to the second switch control end of the second switching unit $Q_2$.

It is worth noting that with respect to the load (or the motor 10), when the first one-way freewheeling unit $D_5$ of the first freewheel circuit 30 is conducted the direction of a current flowing through the first one-way freewheeling unit $D_5$ is different to the direction of a current flowing through the second one-way freewheeling unit $D_7$ of the second freewheel circuit 40 when the second one-way freewheeling unit $D_7$ is conducted. In other words, a first current flow direction associated with the current-conducting path provided by the first freewheel circuit 30 and a second current flow direction associated with the current-conducting path provided by the second freewheel circuit 40 are opposite to each other from the perspective of the load.

Next, please refer to FIGS. 5A, 5B, 6A, and 6B. Operation models of the alternating current chopper circuit with low noise of the instant disclosure are explained below.

Figure 5A:
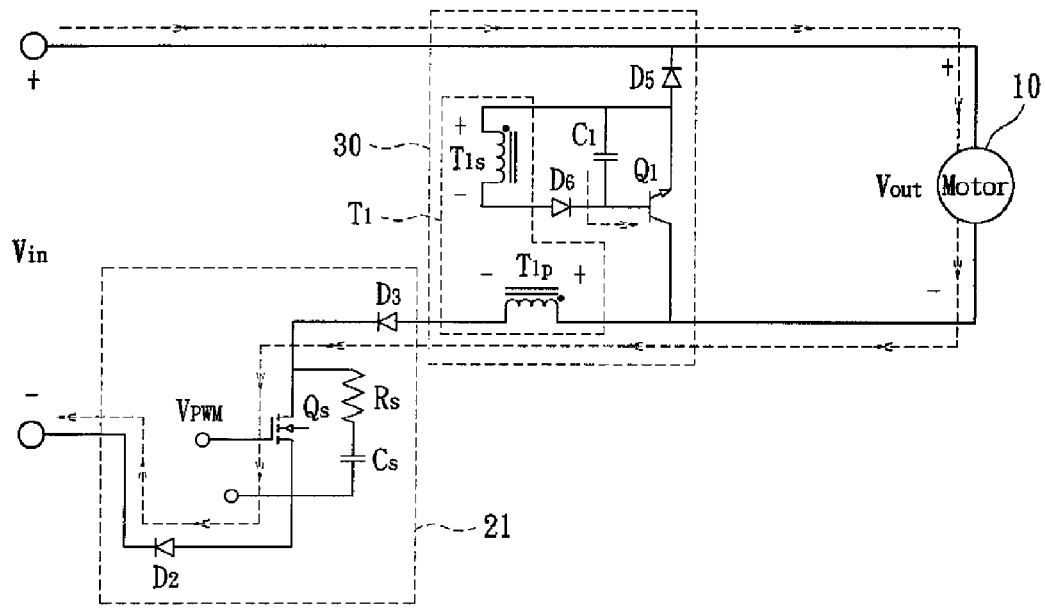

FIG. 5A shows a first operation condition in which the input AC power $V_{in}$ is at positive half cycle (both voltage and current are positive) and the control signal $V_{PWM}$ has turned on the control switching unit Q. As such, the current of the AC power $V_{in}$ would flow across the motor 10, the primary winding $T_{1p}$ of the first transferring unit $T_1$, and the first path 21 of the switching circuit 20.

Meanwhile, the voltage induced by the secondary winding $T_{1s}$ of the first transferring unit $T_1$ is deemed at a "low" voltage level with regard to the first switching unit $Q_1$. However, since the energy stored by the first capacitor $C_1$ would be supplied to the switch control end of the first switching unit Q the first switching unit $Q_1$ may be turned on regardless. Although the first switching unit $Q_1$ is turned on, the AC power $V_{in}$ is considered as a reverse bias with respect to the first one-way freewheeling unit $D_5$ connected to the first switching unit $Q_1$ in series. Therefore, no current flows through the first switching unit $Q_1$ and the first one-way freewheeling unit $D_5$.

Simply speaking, under the first operation condition, the control switching unit $Q_s$ and the first switching unit $Q_1$ are turned on, where the AC power $V_{in}$ is at the positive half cycle and powers the motor 10 through the first path 21 of the switching circuit 20.

Figure 5B:
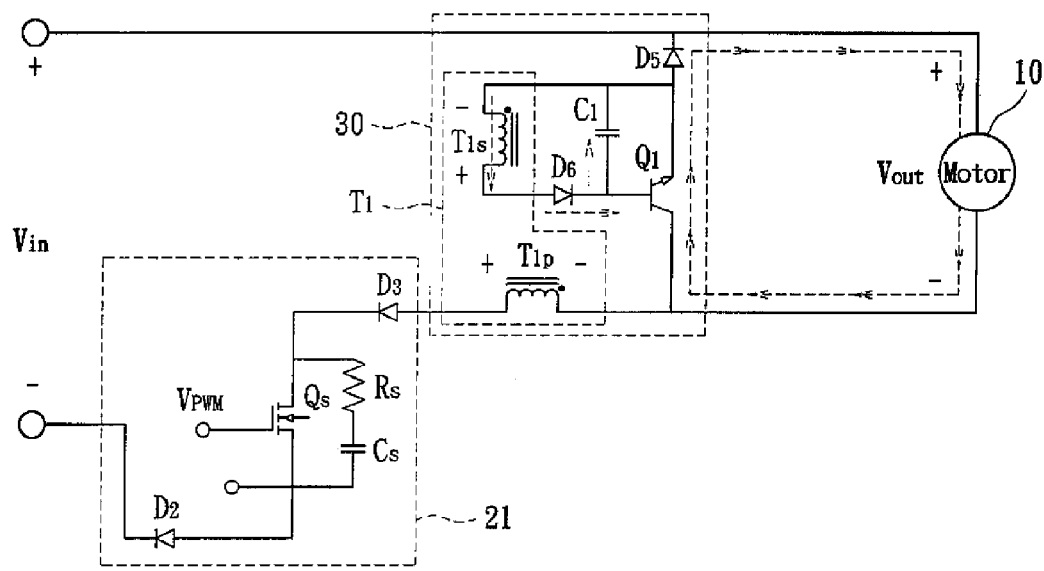
FIG. 5B shows an operation diagram of an alternating current chopper circuit with low noise, where both the input voltage and current are positive and the control switching unit is turned off.

FIG. 5B shows a second operation condition where the input AC power $V_{in}$ is at the positive half cycle (both the voltage and current are positive) and the control signal $V_{PWM}$ has turned off the control switching unit $Q_s$. Under the second operation condition, the secondary winding $T_{1s}$ of the first transferring unit $T_1$ may induce a voltage opposite to the voltage induced by the same under the first operation condition. In other words, the voltage induced by the secondary winding $T_{1s}$ may still turn on the first switching unit $Q_1$ and charge the first capacitor $C_1$.

As one advantage provided by the instant disclosure is to ensure the continuity of the current flow regardless of whether the load is resistive or reactive (inductive or capacitive), the load would utilize the current-conducting path provided by the first freewheel circuit 30 for the current to flow. In other words, the load utilizes the first switching unit $Q_1$ and the first one-way freewheeling unit $D_s$, for maintaining the continuous current flow.

Notably, the switch between the first operation condition and the second operation condition is determined by the control signal $V_{PWM}$ controlling the control switching unit $Q_s$ to turn on or off, with no dead time involved. In other words, the instant disclosure utilizes a driver circuit with only one main switch, where the current flowing through the load is continuous, without additional placement of snubbering units such as resistors and capacitors based on types of the loads. Therefore, the instant disclosure is applicable to the loads of a variety of types, further stabilizing the entire circuitry and simplifying the design thereof.

Figure 6A:
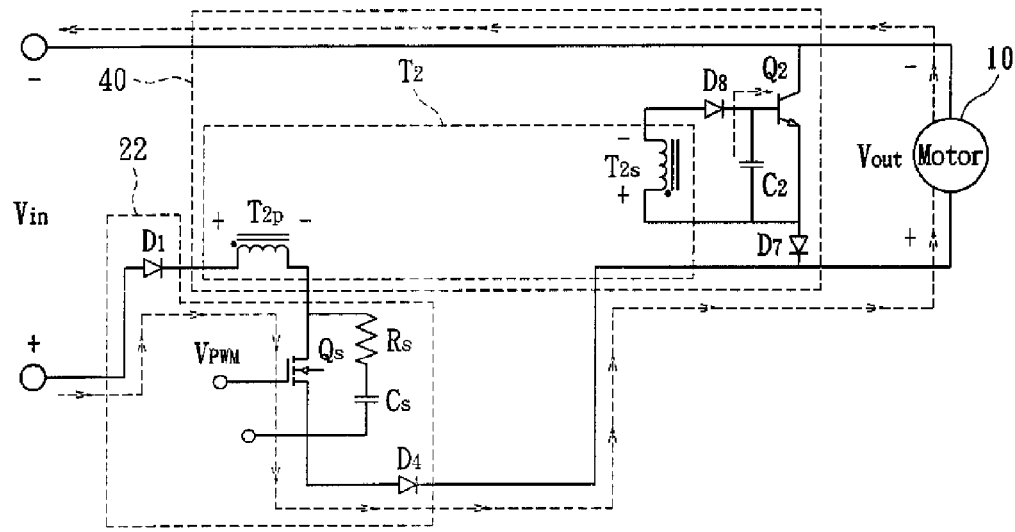

Please refer to FIG. 6A, which shows a third operation condition. When the input AC power $V_{in}$ is at negative half cycle (both voltage and current are negative), and the control signal $V_{PWM}$ has turned on the control switching unit $Q_s$, the current of the AC power $V_{in}$ would flow across the second path 22 of the switching circuit 20 and the primary winding $T_{2p}$ of the second transferring unit $T_2$ to power the motor 10.

Under the third operation condition, the voltage induced by the secondary winding $T_{2s}$ of the second transferring unit $1_2$ is deemed as the "low" voltage level with regard to the second switching unit $Q_2$. However, because the stored energy of the second capacitor $C_2$ would be provided to the switch control end of the second switching unit $Q_2$, the second switching unit $Q_2$ is nevertheless turned on. Although the second switching unit $Q_2$ is turned on, that the AC power $V_{in}$ is at negative half cycle may only provide a reverse bias with the second one-way freewheeling unit $D_7$ connected to the second switching unit $Q_2$ in series, and thus no current may flow across the second switching unit $Q_2$ and the second one-way freewheeling unit $D_7$.

In other words, under the third operation condition, when the control switching unit $Q_s$ and the second switching unit $Q_2$ are turned on, and the AC power $V_{in}$ is at the negative half cycle the second path 22 of the switching circuit 20 may be utilized for the motor 10 to be powered.

Figure 6B:
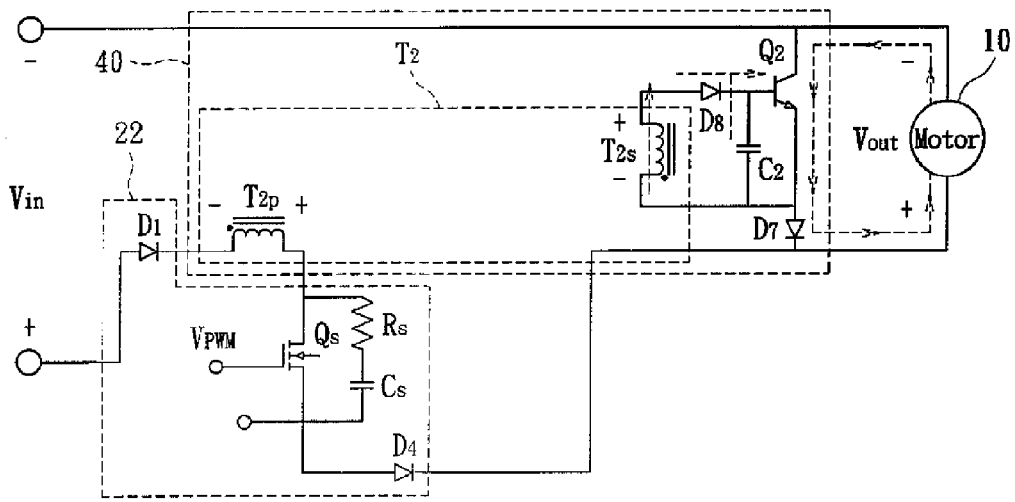
FIG. 6B shows an operation diagram of an alternating current chopper circuit with low noise, where both the input voltage and current are negative and the control switching unit is turned off.

Please refer to FIG. 6B for the illustration of a fourth operation condition in which the input AC power $V_{in}$ is at the negative half cycle, and the control signal $V_{PWM}$ has turned off the control switching unit $Q_s$. Accordingly, the secondary winding $T_{2s}$ of the second transferring unit $T_2$ may induce a voltage opposite to the voltage induced by the same in the third operation condition. In other words, the voltage induced by the secondary winding $T_{2s}$ may turn on the second switching unit $Q_2$ and charge the second capacitor $C_2$.

At the same time, the load may utilize the current-conducting path provided by the second freewheel circuit 40 for the current to flow. In other words, the load utilizes the second switching unit $Q_2$ and the second one-way freewheeling unit $D_7$, for maintaining the continuous current flow.

Similarly, the switch between the third operation condition and the fourth operation condition is solely determined by the control signal $V_{PWM}$ controlling the control switching unit $Q_s$ to turn on or off, with no dead time involved. Therefore, the current flow of the load may be maintained continuously without any interruption.

In addition, as mentioned in above, for both the first operation condition and second operation condition, the first switching unit $Q_1$ is turned on while the second switching unit $Q_2$ (not shown) is turned off. For the third operation condition and the fourth operation condition, the first switching unit $Q_1$ (not shown) is turned off while the second switching unit $Q_2$ is turned on. In other words, in the instant disclosure, the switching frequency of the first switching unit $Q_1$ and that of the second switching unit $Q_2$ would be the same as the frequency of the AC power $V_{in}$.

The benefit of having the switching frequency the same as the frequency of the AC power $V_{in}$ is as follows. Normally, the frequency of the control signal $V_{PWM}$ (20 kHz, for example) is much greater than the frequency of the AC power V, (60 Hz, for example). However, for the instant disclosure, the switching frequency of the first switching unit $Q_1$ and the second switching unit $Q_2$ is the same as the frequency of the AC power $V_{in}$. Thereby, the switching frequency of the control signal is much lower than its counterpart disclosed in the conventional arts. As a result, the service life for the first switching unit $Q_1$ and the second switching unit $Q_2$ may significantly increase, saving the maintenance cost of the driver circuit.

In addition, if the load falls under the tag of the reactive load, the voltage and current may be out of phase. The instant embodiment uses the inductive type of the reactive motor as the load for example in which the inductive load may cause the current lags the voltage. Therefore, for a cycle of an input waveform, in addition to the abovementioned positive voltage and positive current, negative voltage and negative current, other possible scenarios include negative voltage and positive current, along with positive voltage and negative current may also be included.

Figure 7A:
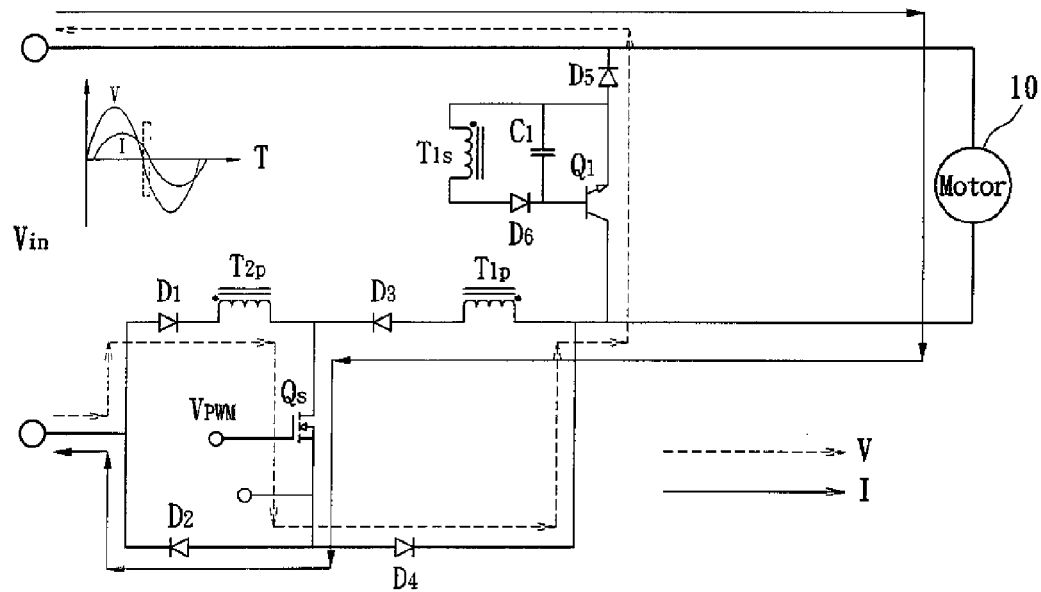
Figure 7B:
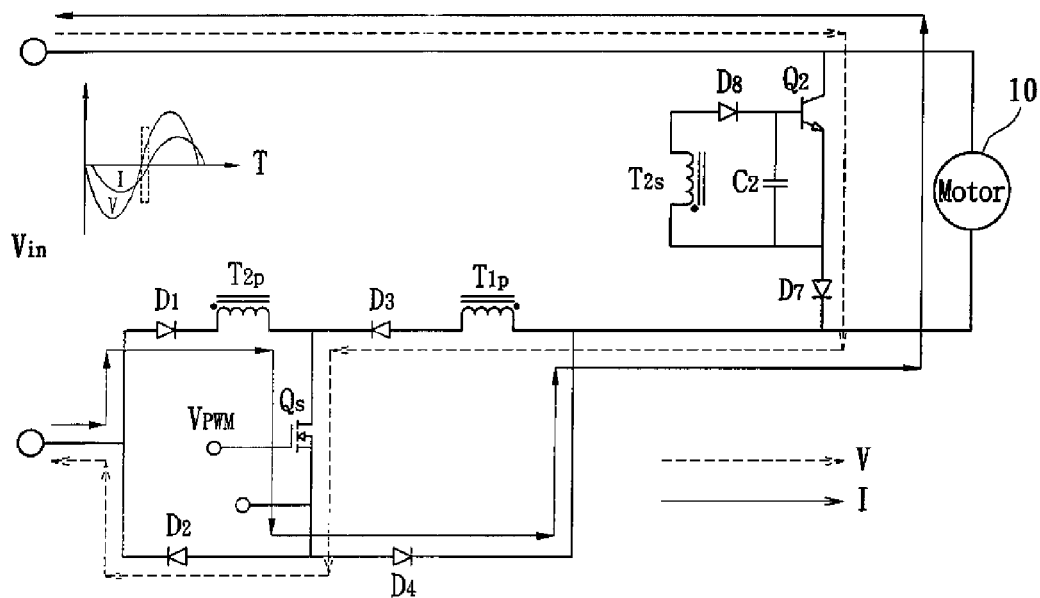

As shown in FIG. 7A, where loop 1 is denoted by the dashed line and the loop 2 is denoted by the solid line. For the period in which the voltage is negative and the current is positive, the current flows across the primary winding $T_{1p}$ of the first transferring unit $T_1$. The voltage induced by the secondary winding $T_{1s}$ of the first transferring unit $T_1$ may turn on the first switching unit $Q_1$. However, at that particular moment, the voltage may have changed from the positive half cycle to the negative half cycle, causing the current as the result of the swing from the positive half cycle to the negative half cycle to flow through the current-conducting path of the first switching unit $Q_1$ and results in short circuit. Likewise, as shown in FIG. 7B, for the period in which the voltage is positive with the current being negative, similar short circuit may result, destabilizing the entire circuitry and increasing the likelihood of damage to the same.

Figure 8:
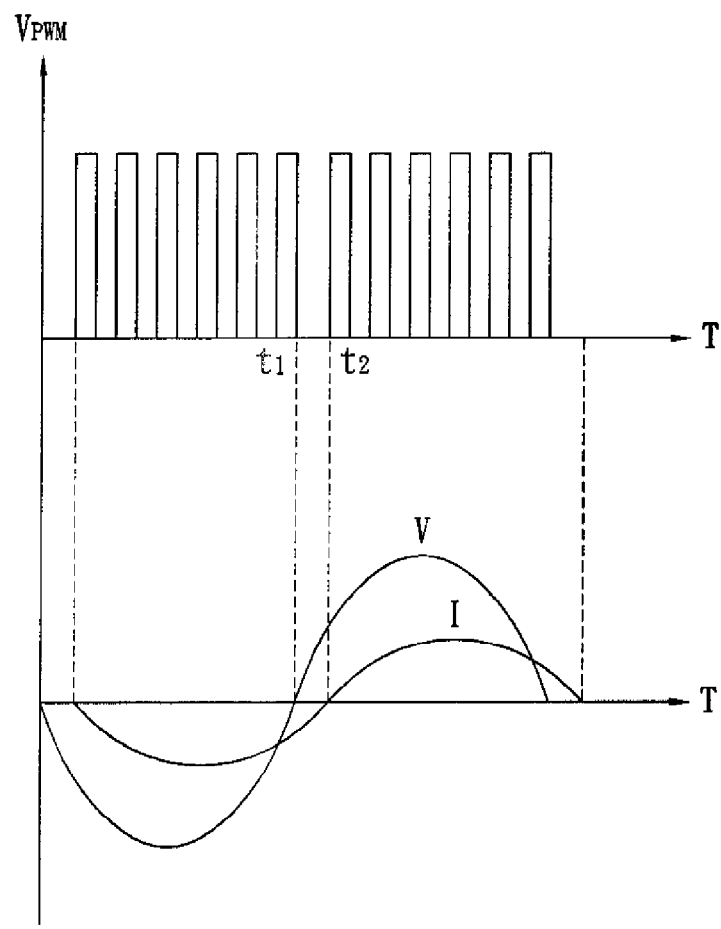
FIG. 8 shows waveforms of the input voltage and input current having different phase for the control switch.

Conventionally, three methods are available to resolve the issue of the voltage and the current being out of phase. The first method involves front ending a capacitor to align the phases of the voltage and the current. However, such method is only for a particular type of motor or similar loads. Since the different loads may be associated with different phase differences, many different capacitors may be ready for the replacement purpose. The second method is to front end an inductor. The inductor may be utilized to restrict the current to prevent any instantaneous surge thereof. However, the solution does not resolve the root cause of the problem as the additional inductor may further increase the phase difference between the voltage and the current. The third option is to revise the software area, as shown in FIG. 8, to ensure the control switching unit $Q_s$ to remain turned off by maintaining the control signal $V_{PWM}$ sent by the drive controller to the control switching unit $Q_s$ at the low voltage level during the period between t1 and t2 where the phase difference may occur. Thereby, within the time period between $t_1$ and $t_2$, the first switching unit $Q_1$ and the second switching unit $Q_2$ would not be turned on mistakenly or accidentally to minimize the occurrence of short circuit. Such method is not limited by the type and specification of the load, and is serviceable for any applications.

Figure 9:
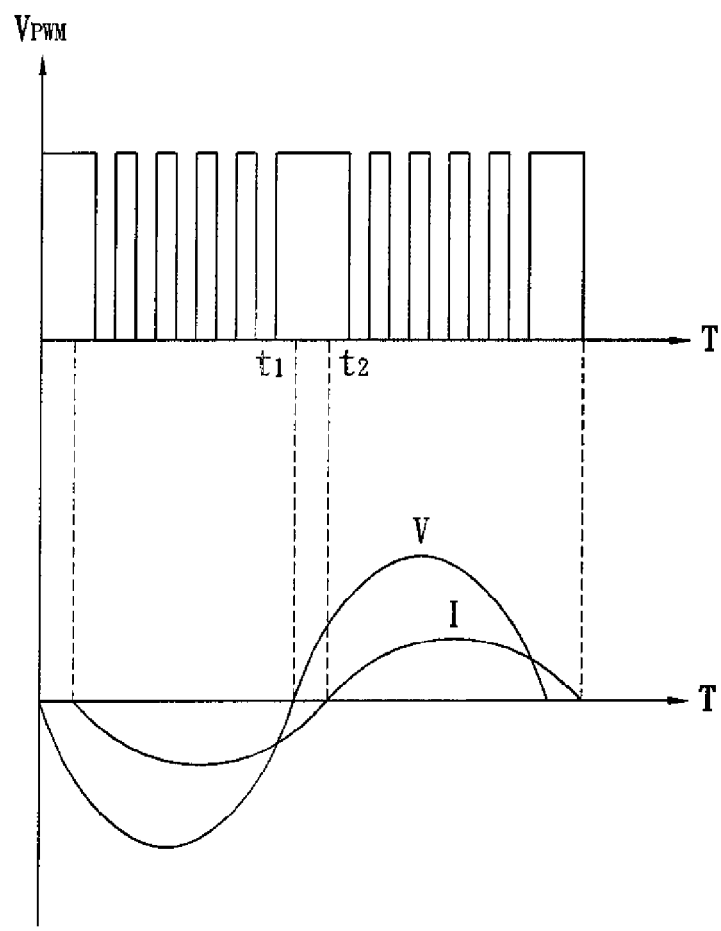
FIG. 9 shows waveforms of the input voltage and input current having different phase for the control switch according to another exemplary embodiment of the present disclosure.

FIG. 9 shows waveforms of the input voltage and input current having different phase for the control switch according to another exemplary embodiment of the present disclosure. The revising method via the software is to ensure the control switching unit $Q_s$ to remain turned on by maintaining the control signal $V_{PWM}$ sent by the drive controller to the control switching unit $Q_s$ at the high voltage level during the period between t1 and t2 where the phase difference may occur. Thereby, within the time period between $t_1$ and $t_2$, the first switching unit $Q_1$ and the second switching unit $Q_2$ would not be turned on mistakenly or accidentally to minimize the occurrence of short circuit. Such method is not limited by the type and specification of the load, and is serviceable for any applications.

The alternating current chopper circuit with low noise of the instant disclosure uses a transferring unit, such as a transformer, to control the switching unit that provides the conduction path for the load. The dead time condition is also eliminated to remove the adverse effect on current continuity. Furthermore, the use of the freewheeling unit is applicable to any types of load and specification, eliminating the necessity of modifying the circuit design for different loads and thereby enhancing the circuit flexibility and value for convenience in use.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. An alternating current chopper circuit with low noise, comprising:
    a switching circuit having a control switching unit, wherein the control switching unit turns on or turns off according to a control signal sent by a drive controller;
    a first freewheel circuit connected electrically to the switching circuit and a load, the first freewheel circuit having a first switching unit and a first freewheeling unit, wherein the first freewheeling unit is a first transformer with a primary winding thereof connected to a first path of the switching circuit in series, and a secondary winding thereof connected to a first switch control end of the first switching unit; and
    a second freewheel circuit connected electrically to the switching circuit and the load, the second freewheel circuit having a second switching unit and a second freewheeling unit, wherein the second freewheeling unit is a second transformer having a primary winding thereof connected to a second path of the switching circuit in series, and a secondary winding thereof connected to a second switch control end of the second switching unit;
    wherein when the control switching unit is turned off, the first freewheeling unit turns on the first switching unit, or the second freewheeling unit turns on the second switching unit, for providing a current-conducting path to the load to maintain a continuous current flow;
    wherein the first freewheel circuit further comprises a first one-way freewheeling unit connected to the first switching unit in series, and wherein the second freewheel circuit further comprises a second one-way freewheeling unit connected to the second switching unit in series.

2. The alternating current chopper circuit with low noise of claim 1, wherein the first freewheel circuit further comprises a first capacitor connected to the secondary winding of the first transformer in parallel, and wherein the second freewheel circuit further comprises a second capacitor connected to the secondary winding of the second transformer in parallel.

3. The alternating current chopper circuit with low noise of claim 1, wherein a first current flow direction of the first one-way freewheeling unit and a second current flow direction of the second one-way freewheeling unit is opposite with respect to the load.

4. The alternating current chopper circuit with low noise of claim 1, wherein the first one-way freewheeling unit and the second one-way freewheeling unit are diodes.

5. The alternating current chopper circuit with low noise of claim 1, wherein the load is a motor.

6. The alternating current chopper circuit with low noise of claim 5, wherein based on a duty cycle of the control signal, the drive controller turns the control switching unit on or off to adjust a motor speed.

7. The alternating current chopper circuit with low noise of claim 1, wherein the first switching unit and the second switching unit are bipolar junction transistors.

8. The alternating current chopper circuit with low noise of claim 1, wherein the control switching unit is a metal-oxide-semiconductor field-effect transistor.

9. The alternating current chopper circuit with low noise of claim 1, wherein the load is a reactive load, the control switching unit is configured to remain turned off by maintaining the control signal at a low voltage level during the period between an input voltage and an input current having different phases.

* * * * *